(12) United States Patent  
Betzler et al.

(10) Patent No.: US 8,823,699 B2  
(45) Date of Patent: Sep. 2, 2014

(54) GETTING SNAPSHOTS IN IMMERSIBLE 3D SCENE RECORDING IN VIRTUAL WORLD

(75) Inventors: Boas Betzler, Magstadt (DE); Neil A. Katz, Ft. Lauderdale, FL (US); Gang Wang, Shanghai (CN); Yu Hui Wu, Beijing (CN); Meng Ye, Beijing (CN); Zi Yu Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 13/108,613

(22) Filed: May 16, 2011

(65) Prior Publication Data

US 2012/0293487 A1     Nov. 22, 2012

(51) Int. Cl.  
  *G06T 15/00*     (2011.01)

(52) U.S. Cl.  
  USPC .......................................... 345/419

(58) Field of Classification Search  
  CPC ......... G06T 17/00; G06T 17/05; G06T 19/00; G06T 13/80; G06Q 50/01  
  See application file for complete search history.

(56) References Cited

U.S. PATENT DOCUMENTS

| 6,084,594 | A | 7/2000 | Goto | |
|---|---|---|---|---|
| 6,538,654 | B1 * | 3/2003 | Rose et al. | 345/473 |
| 6,868,338 | B1 | 3/2005 | Elliott | |
| 7,187,377 | B1 | 3/2007 | Pella | |
| 7,221,366 | B2 | 5/2007 | Uyttendaele et al. | |
| 2008/0091692 | A1 | 4/2008 | Keith | |

OTHER PUBLICATIONS

Mike Craven, et al., "Ages of Avatar: Community Building for Inhabited Television," ACM 2000, Proceedings of the ACM Third International Conference on Collaborative Virtual Environments (CVE 2000), San Francisco, Sep. 10-12, 2000, pp. 189-194.

Murata, K. et al, "3-D Volume Communication System and its Application to e-Learning," EOS Transactions, American Geophysical Union, Suppl., vol. 87, No. 52, Dec. 26, 2006.

Alex Vakaloudis, et al., "Modelling, Querying and Developing Spatiotemporal Applications Based on VRML," 7th International Conference in Central Europe on Computer Graphics, Visualization and Interactive Digital Media '99 (in cooperation with EUROGRAPHICS and IFIP WG 5.10) WSCG '99. Conference Proceedings, vol. 3, pp. 118-125. PResented Feb. 8-12, 1999 at Plzen, Czech Republic.

Kanade, T., et al., "Virtualized Reality: Being Mobile in a Visual Scene," Object Representation in Computer Vision II, ECCV '96 International Workshop, Proceedings, pp. 273-285. Published by Springer Verlag, Berlin, Germany. Presented at ECCV '96, Apr. 13-14, 1996, Cambridge, UK.

Numaoka, C., "CyberGlass: Vision-based VRML2 Navigator," Virtual Worlds, First International Conference, VW '98. Proceedings, pp. 81-87. Published by Springer-Verlag, Berlin, Germany. Presented at VW '98, Jul. 1-3, 1998, Paris, France.

* cited by examiner

*Primary Examiner* — Edward Martello  
(74) *Attorney, Agent, or Firm* — Michael J. Buchenhorner

(57) ABSTRACT

A system and method for using an encoding module in a virtual world server for: receiving scene data including a description of at least one virtual object and underlying terrain associated with the scene; organizing the description of the at least one virtual object into a first track segmented by virtual object time slots, organizing the description of the underlying terrain into a second track segmented by terrain time slots; and storing the descriptions in persistent storage as separate files where users can retrieve and render the separate files.

20 Claims, 17 Drawing Sheets

GETTING SNAPSHOTS IN IMMERSIBLE 3D SCENE RECORDING IN VIRTUAL WORLD

FIELD OF THE INVENTION

The invention disclosed broadly relates to the field of virtual world applications and more particularly relates to the field of immersive three-dimensional scene recording.

BACKGROUND OF THE INVENTION

The proliferation of virtual world applications has enhanced a multitude of technology fields, from film-making and video gaming to medical technology, business communications, and news broadcasting, collaborative virtual environments (CVEs), and broadcast media.

Scene recording in the virtual world is defined as the recording of all of the activities and backdrop in a virtual world application. In scene recording, the objective is to record all of the elements related to the virtual world activities occurring within the scene, such as the virtual objects within the scene, the avatars, the actions of the virtual objects, the actions of the avatars, and the relationships between the virtual objects and the avatars. Many other functions depend on scene recording. For example, scene recording acts as a history log in the virtual world (VW). This history log function enables the searching and replaying of the activities in scene recording. In scene recording, the VW servers must log the history of every activity of every avatar and every virtual object at every minute of every scene. This information is then saved and stored as snapshots. These activities are used by the core engines to send to virtual world clients. So the history snapshot module in a virtual world server is a virtual client. No avatar controls this virtual client. This virtual client is only used to save scene data from the core engine as snapshots. The virtual client may send some commands to the core engine, just like scene updating.

The core engines of virtual worlds handle many virtual objects. Just like FIG. 2, every virtual object maintains a finite state machine. Messages from users' clients and core engines are input to the finite state machine. These inputs make the states change to new states and output. These outputs are handled by a physics engine. Then the results are saved as attributes of virtual objects. So the inputs and attributes of virtual objects can be saved to support replaying later.

Live Broadcasting immersive 3D scene recording permits users to roam in the scene to watch the events unfold. Most live broadcasts are of the 3D format, restricting the user to watching a fixed picture of the scene at a certain time (a snapshot). Most of the information from the scene is lost upon broadcasting. But with immersive 3D scene recording, all of the information of a given scene is recorded, so that the scene can recur again and the user can watch the events unfold in different regions at the same time, or watch the news from different viewpoints. This kind of live broadcasting is of the 4D format. The drawback is that the viewpoint can't be changed once the scene is recorded. If the user wants to watch from another viewpoint, more video needs to be recorded, so the recorded information is redundant.

Halo3 and Evilavatar address this drawback. However, these are limited to saving film at the client end and can only save scenes in one player's view scope. It cannot save all status and objects of the virtual world at server end and users cannot choose any parts of scenes at any time to replay.

Some known technologies are related to virtual world scene recording. U.S. Pat. No. 6,724,385 entitled "Method of replaying game, recording medium, program, and entertainment system" describes a method of replaying a game, a recording medium, a program, and an entertainment system which makes it possible to replay images from various viewpoints when games of various genres are replayed. But in this method, the scene saving on the recording medium follows a video format and some special 3D information. And the viewing paths while replaying are fixed when recording. U.S. Pat. No. 7,221,366, entitled "Real-time rendering system and process for interactive viewpoint video" is directed toward a system and process for rendering and displaying an interactive viewpoint video in which a user can watch a dynamic scene while manipulating (freezing, slowing down, or reversing) time and changing the viewpoint at will. But this method only involves re-building a video scene based on multi-viewpoint videos. The viewpoint could not be changed once the scene is recorded. If the user wants to watch from a different viewpoint than that which has been recorded, more video needs to be recorded, so the recorded information is redundant.

Immersive 3D scene recording (sometimes referred to as "tele-immersion" in 3D) is live broadcasting of the four-dimensional (4D) format. It has a wide range of uses: from broadcasting information, teaching dance moves, and remote office collaboration, allowing the user to roam in a scene to watch the events happening from any viewpoint they want. With immersive 3D scene recording, all the information pertaining to a given scene is recorded, so the scene can recur again (be replayed), and the user can even watch the events unfold in different regions at the same time, or watch the news from different viewpoints. Immersive 3D scene recording is best described as scene recording that can be rendered and users can immerse themselves, via an avatar, into the rendered scene, and freely navigate within the scene. Immersive 3D scene recording can be used in news recording, such as CNN in virtual worlds, live news broadcasting, activities logging, and other scenes recording in virtual worlds. As an example, assume a user controls an avatar in an immersive 3D scene. The setting is a backyard pool party; therefore the scene includes: a pool, pool deck, lounge chairs, landscaping, a barbecue, patio tables, and patio chairs with food and drinks for the guests. The avatar can be "positioned" to "see" the scene from different viewpoints. The avatar can look out at the backyard pool, the avatar can sit at a table, the avatar can face the barbecue area.

Virtual Collaboration.

Halo3 includes some sophisticated replay functions, including post-recording camera view selection, called "Save Film". (see http://www.the-laser.com/halo3_xbox360.htm and http://www.evilavatar.com/forums/showthread.php?t=32819&). It is however limited to "save film" at client end and can only save scenes in one player's view scope. It cannot save all status and objects of the virtual world at server end and users cannot choose any parts of scenes at any time to replay.

SUMMARY OF THE INVENTION

Briefly, according to an embodiment of the invention a method comprises steps or acts of: using an encoding module in a virtual world server for: receiving scene data comprising a description of at least one virtual object and underlying terrain associated with the scene; organizing the description of the at least one virtual object into a first track segmented by virtual object time slots, organizing the description of the underlying terrain into a second track segmented by terrain time slots; and storing the descriptions in persistent storage as separate files where users can retrieve and render the separate files.

The method can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
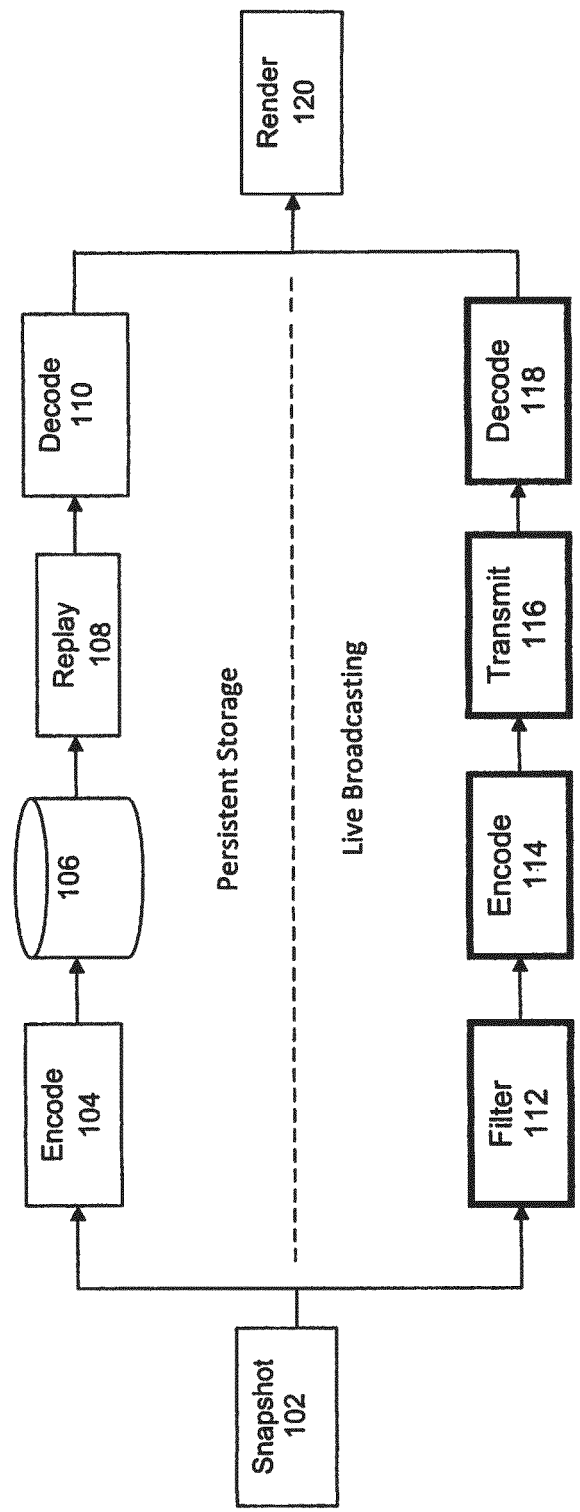
FIG. 1 shows a simplified diagram of an architecture of an immerseable 3D recording system, according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe an improved system and method to implement live broadcasting in a four-dimensional (4D) virtual format using immersive 3D (three-dimensional) scene recording in the virtual world. Existing live broadcasting is limited to a 3D format wherein the user can only watch a fixed picture of the scene at any one time. Most information of the scene is lost once it has been played (broadcasted). We introduce a system and method to record, save, encode, transmit and replay 3D scenes from a history recording based on snapshots so that all of scene information is available.

A snapshot is saved of a 3D scene containing the status of all virtual objects (VOs) and the associated terrain. Once the scene is recorded, the scene can be replayed from a different viewpoint than the viewpoint originally recorded from in the snapshot because all of the information needed to "build" the scene from another viewpoint is still available. Therefore, even if the camera position (or what the avatar "sees") changes, the scene can be replayed from the new camera position, with all of the VOs intact.

A key aspect of the present invention is that we capture object space, not frames. To this end we introduce an optimization in the form of timer ticks to optimize the amount of data to encode and transmit. The present invention stores the VO descriptions and terrain descriptions in different tracks, ordered by timestamps. The downside to "flattening" (video frame grab) as used in the known art is that you cannot change camera position. A tick according to the invention captures the encoding and the state of each VO and analyzes which of the VOs has an entry with respect to state change. The detail of what is captured in the scene can be determined by policy.

Another key aspect of the present invention is the introduction of a separate entity (dataset) to describe the terrain used to create a scene. This allows more flexibility in altering the terrain when a scene is shown from a different viewpoint. To this end we separate and track object geometry and terrain geometry. We acknowledge the difference between the state change of a VO and the state change of the underlying terrain.

An advantage of the present invention is that it reduces the computational load on the system. This is because we only download the VO and terrain descriptions that are required for the new scene to be rendered. In contrast, the known art requires downloading of the entire scene graph for every replay. This means that the user is potentially downloading VO and terrain descriptions that the user doesn't need.

Some of the key attributes of the invention are:
1. We only capture state;
2. We isolate and track the object geometry and terrain geometry;
3. We transmit the VO and terrain definition only if the VO is introduced in the selected scene; therefore only the VO and terrain required by the selected scene is rendered.
4. We optimize the amount of data that is transmitted and the amount of computation complexity.

Figure 16:
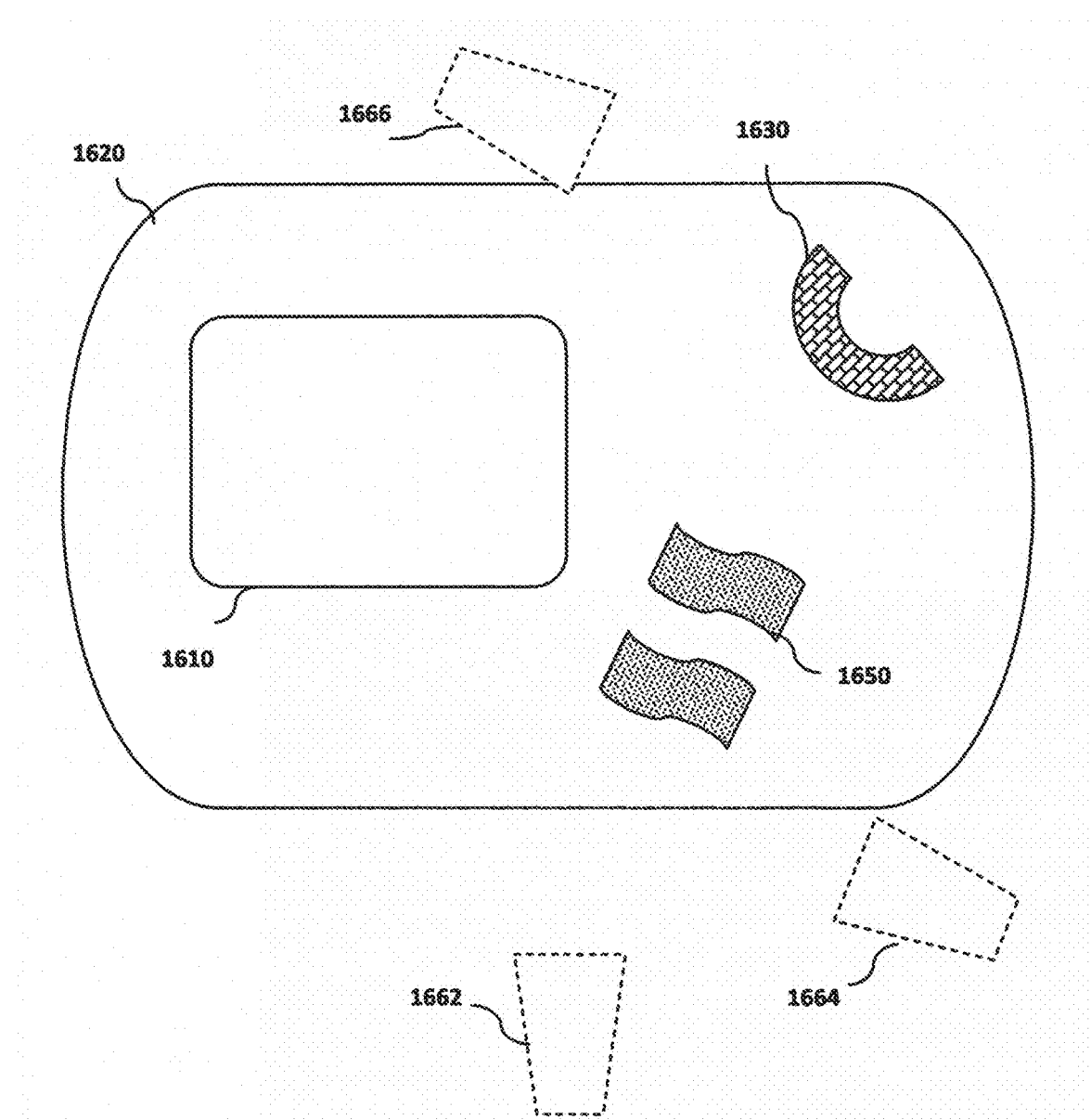
FIG. 16 is a simplified illustration of a scene recording, according to an embodiment of the present invention.

With this system, we can easily isolate and access only the VO and terrain descriptions needed for the replayed scene. Referring now in specific detail to the drawings, and particularly to FIG. 16, there is illustrated a pool scene with different viewpoints. Continuing with the pool party example introduced earlier, assume that the user wants to replay a scene from a different viewpoint. The initial viewpoint 1662 showed the pool deck 1620, pool 1610, lounge chairs 1650 and barbecue 1630.

Let's say in a scene change the avatar (a VO) is now "looking" at the pool 1610 and lounge chairs 1650 and not the barbecue area 1630 (viewpoint 1664). Now the user wants to replay this scene, but with the avatar facing away from the pool 1610, towards the barbecue 1630 (viewpoint 1666). In the known art, all of the VO and terrain descriptions would be downloaded, even though not all of them would be used for rendering. For example, in the known art, the descriptions for the pool, the pool deck, pool loungers, and so forth will be downloaded, but they are not needed. We transmit the VO and terrain definition only if the VO is introduced in the selected scene to be rendered. Only the VO and terrain description required by the scene is rendered.

To accomplish this, we augment the decoding step in traditional 3D recording. In the known art, decoding is required to download the scene graph which is the large, initial dataset. This means that you are potentially downloading a VO and/or terrain description that you don't need for the scene. In contrast, we use an object definition only if it is in the policy, i.e., if the object definition is needed to render an object for a selected scene.

Referring now in specific detail to the drawings, and particularly to FIG. 1, there is illustrated a high-level rendering of an architecture for an immersive 3D recording system 100, according to an embodiment of the present invention. The flow of snapshot is described as follows:

1. Simulation engine delivers the whole virtual world updating data to history snapshot module.
2. History snapshot module analyzes the messages from core engine.
3. If some messages need commands feedback to core engine, history snapshot module will send the commands.
4. History snapshot module sends the data to post processing modules.

System Requirements.

There are two requirements for an immersive 3D recording system. One is persistent storage. And the other is live broadcasting capability. The process of storing persistently is described first. First, a Snapshot Module 102 of a virtual world (VW) server records a snapshot of the VW. The VW servers must log the history of every activity of every avatar and every VO at every minute. These activities are the results which the core engines put out and send to VW clients as "scenes." So the history snapshot module in VW server is a virtual client. No avatar controls this virtual client. This virtual client is used only to save scene data from the core engine as snapshots. The virtual client may send some commands to the core engine, such as scene updating commands (add, delete, change). The VW core engine handles many VOs. Every VO maintains a finite state machine.

Messages from the user's clients and core engines are input to the finite state machine. These inputs make the states change to new states and output. These outputs are handled by a physics engine. Then the results are saved as attributes of VOs. The inputs and attributes of VOs are saved to support replaying later.

Figure 12:
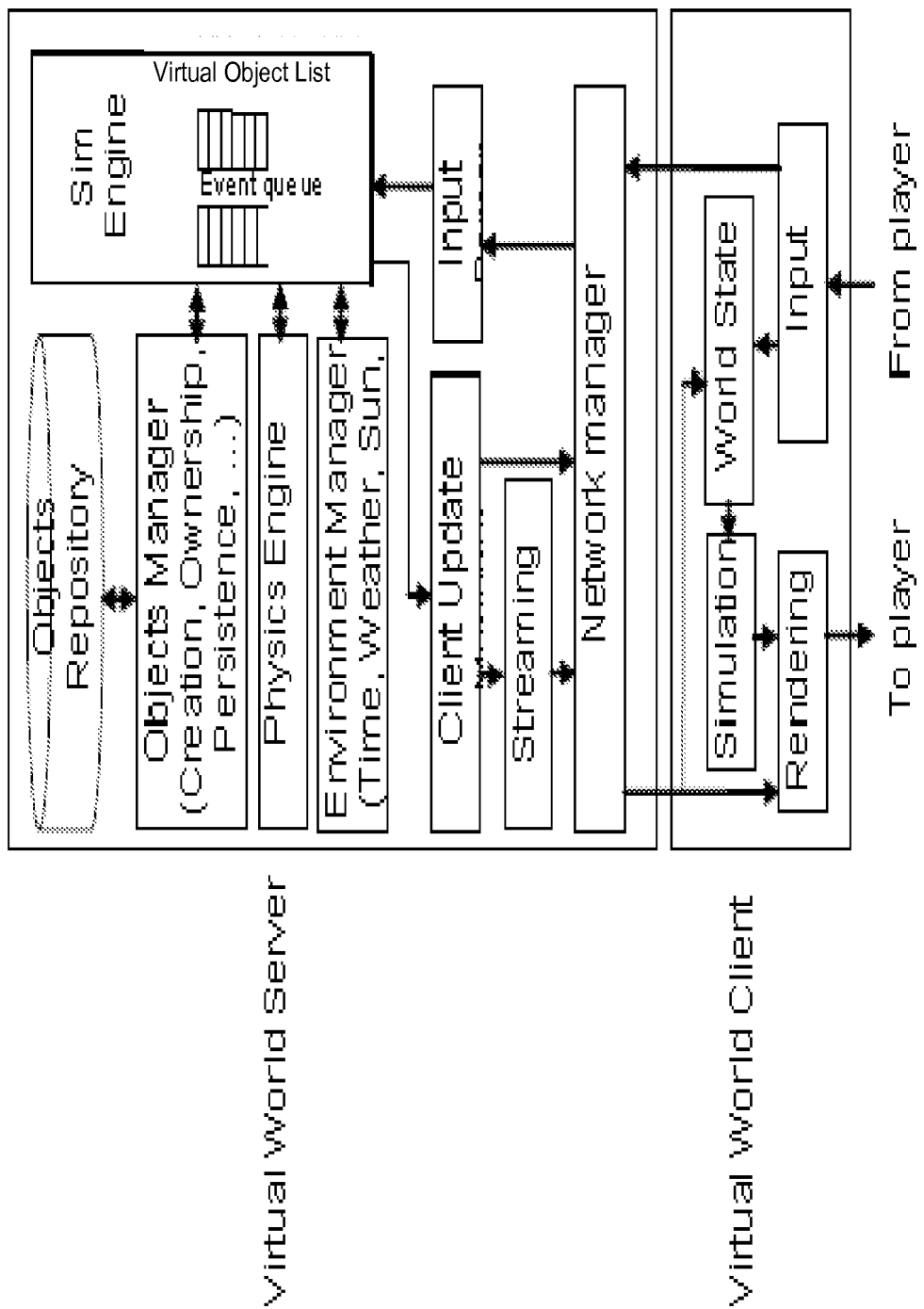
FIG. 12 shows a decoding flow diagram according to an embodiment of the present invention.
Figure 13:
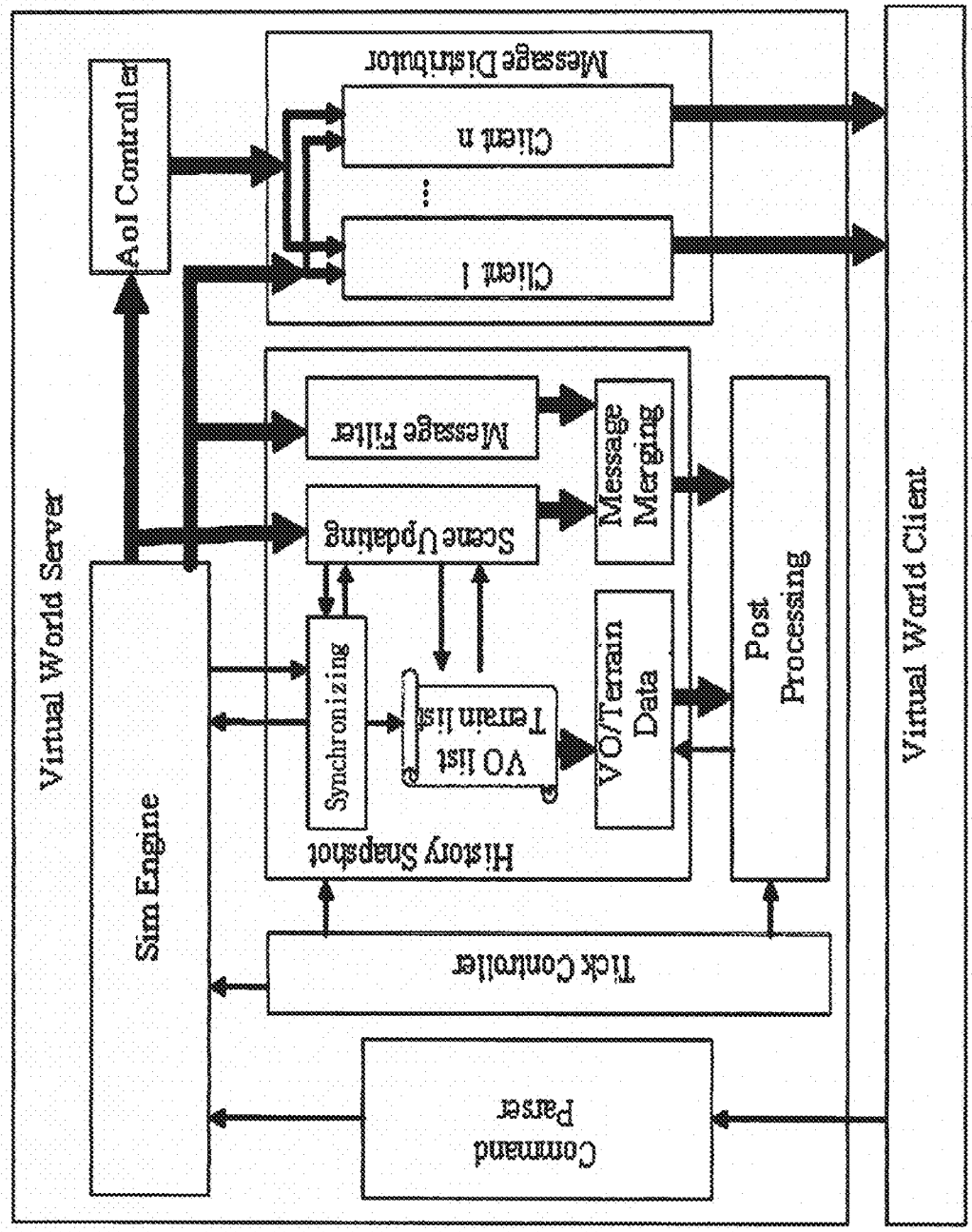
FIG. 13 is a history snapshot module, according to an embodiment of the present invention.

See FIG. 12—architecture of VW server and client. See FIG. 13—History snapshot module sends the data to post processing modules. Referring now to FIG. 13, within the Virtual Worlds (VW) server, a SIM Engine delivers the whole VW updating data to the History Snapshot Module. The History Snapshot Module analyzes the messages from the core engine and sends the data to the post-processing modules.

Next, an Encoding module 104 encodes the snapshot data to a special format for storing persistently, then the encoded data is stored in persistent storage 106. When users want to replay some scenes, the data according to the scenes is read from the storage 106 and re-played by a Player Module 108. Optionally, the scene data can be decoded by a decoder 110. The decoded data is then rendered 120. At this time, users (perhaps as an avatar) can immerse themselves in the rendered scene, and navigate freely within the scene. But those users can only see the scene playing instead of interfering with any objects in the scene.

Live broadcasting is described as follows: first, as previously described, a Snapshot of the VW is recorded by the VW server. Then, the snapshot data is filtered to a determined range by Filter 112. The determined range is the environment of the VW in which the avatar is located. This may include the avatar itself, the VOs surrounding the avatar, and the terrain.

The filtered snapshot data are encoded to a special format for live broadcasting by Encoder 114. The encoded data will be transmitted through some real time transporting protocol 116. In some viewers, the scene data are decoded by Decoder 118. Lastly, the decoded data will be rendered 120. At this time, the users can immerse themselves in the rendered scene, and navigate in the scene freely.

Filtering.

Figure 2:
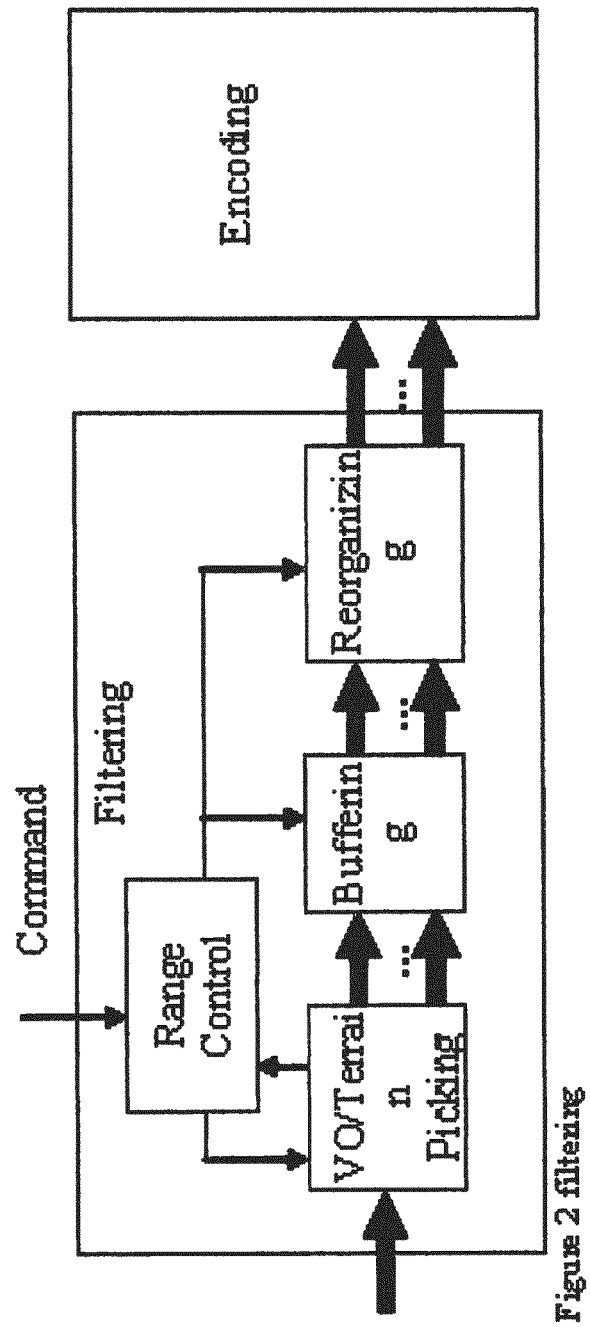
FIG. 2 shows a simplified diagram of the processing involved in the Filtering module of FIG. 1, according to an embodiment of the present invention.

Referring to FIG. 2, there is shown a process flow diagram 200 for the

Filter 112 of FIG. 1. In step 202, the snapshot data is delivered from the Snapshot Module 102. Then the necessary data is picked up from the data according to the configuration from the live broadcasting controller. In step 204, the streaming data that is selected is buffered. In step 206 the streaming data is reorganized. In step 208, the reorganized data is delivered to the Encoding Module 114. In step 210, when a live broadcasting controller wants to change the region and other parameters during live broadcasting, he/she can send a command to range control module. This module will control other modules to take changing actions.

Encoding.

Figure 3:
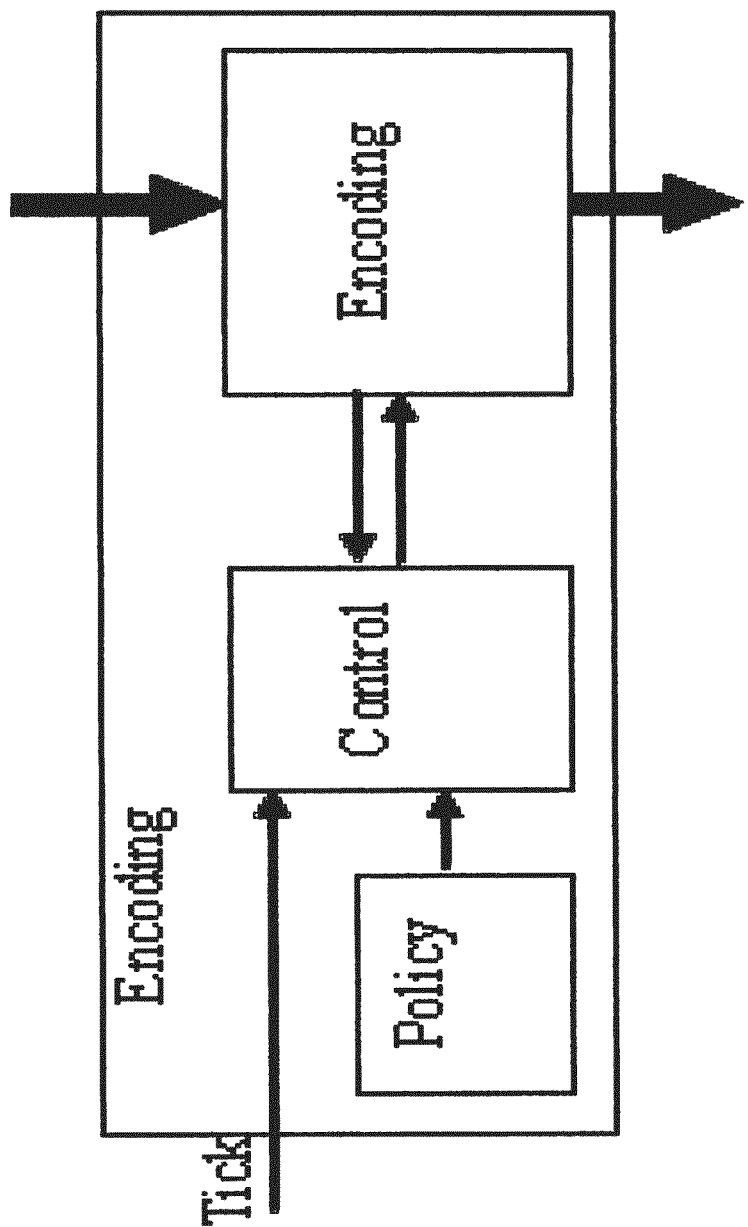
FIG. 3 shows a simplified diagram of the processing involved in the Encoding module of FIG. 1, according to an embodiment of the present invention.

Referring to FIG. 3, we show one encoding architecture diagram. After picking up scene data, the data will be recorded in order to save bandwidth and be easily organized. The data includes not only the models of VOs, but the terrains, actions, and the relation between the VOs and the avatars representing the users.

In this method, the IDs of the VOs and terrains, the status of the VOs, actions of VOs, and other information are serialized into streaming. But all of the model data are not embedded in the streaming. When the streaming is rendered, the player will fetch the model data of VOs and terrains from snapshot module in live broadcasting source servers.

Time Ticks.

The architecture of the encoding module is shown in FIG. 3. In this format, the data sequence of every VO or terrain is organized into one, separate track. So there are two distinct types of tracks used: one is the VO track; and the other is the terrain track. All of the data in the tracks are stored in time ticks to provide a history. The time ticks are organized as slots. The data structure in the slots of the VO track contains the following:

a) the VO ID (Virtual Object Model ID). This ID indicates which VO the slot stands for. When the slot is rendered and if the model object of the VO is not there, the player will fetch the model data of VOs and terrains from the snapshot module in the live broadcasting system.

b) Status. This field records the status of the VOs at this time.

c) Action. This field records the action that the VO takes at this time.

In contrast, the data structure in the terrain track slots contains the Terrain ID. This ID indicates which terrain the slot stands for.

Figure 4:
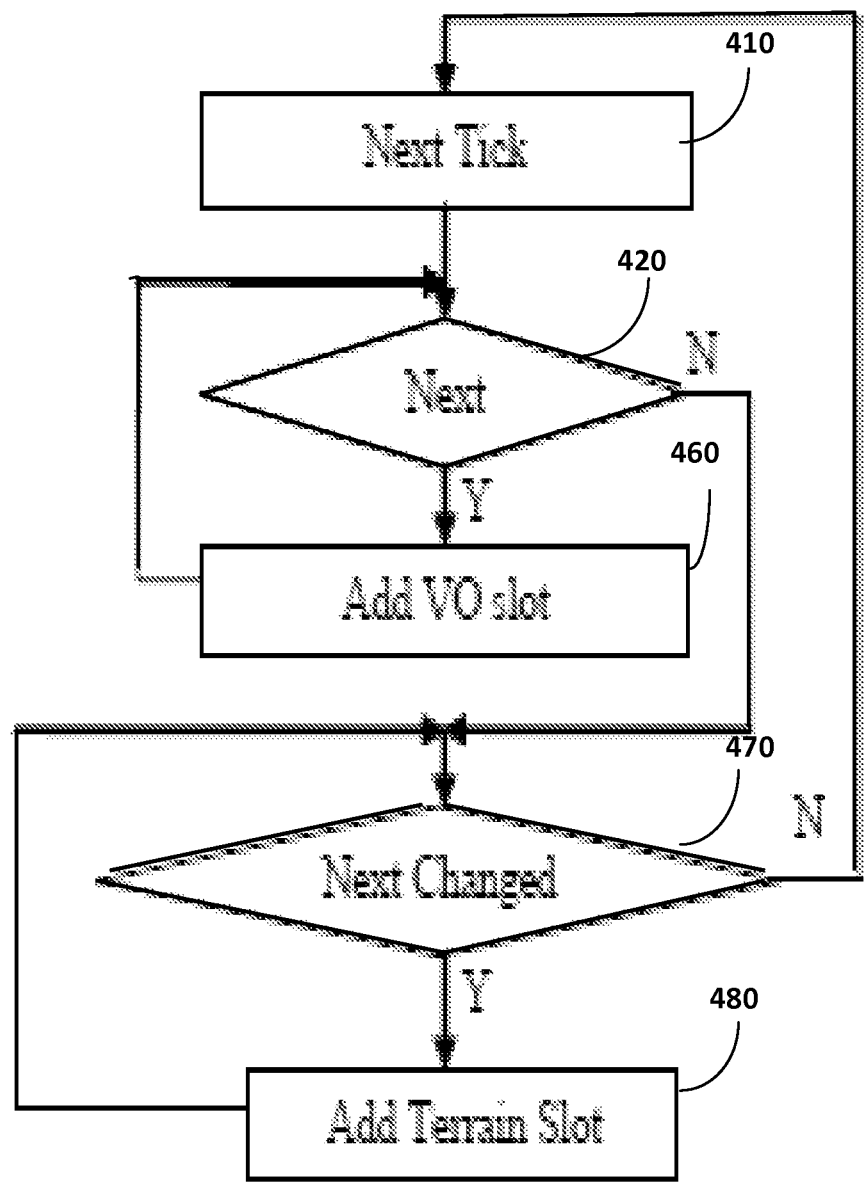
FIG. 4 shows an encoding flow diagram, according to an embodiment of the present invention.

Referring to FIG. 4, there is shown an encoding flow diagram. The method proceeds for each tick 410 by adding a VO slot 460 for every message 420 about the VO; and adding a terrain slot 480 for every message 470 about the terrain. We model the terrains as well as the VOs, one track for each.

Virtual Object Track.

Figure 14:
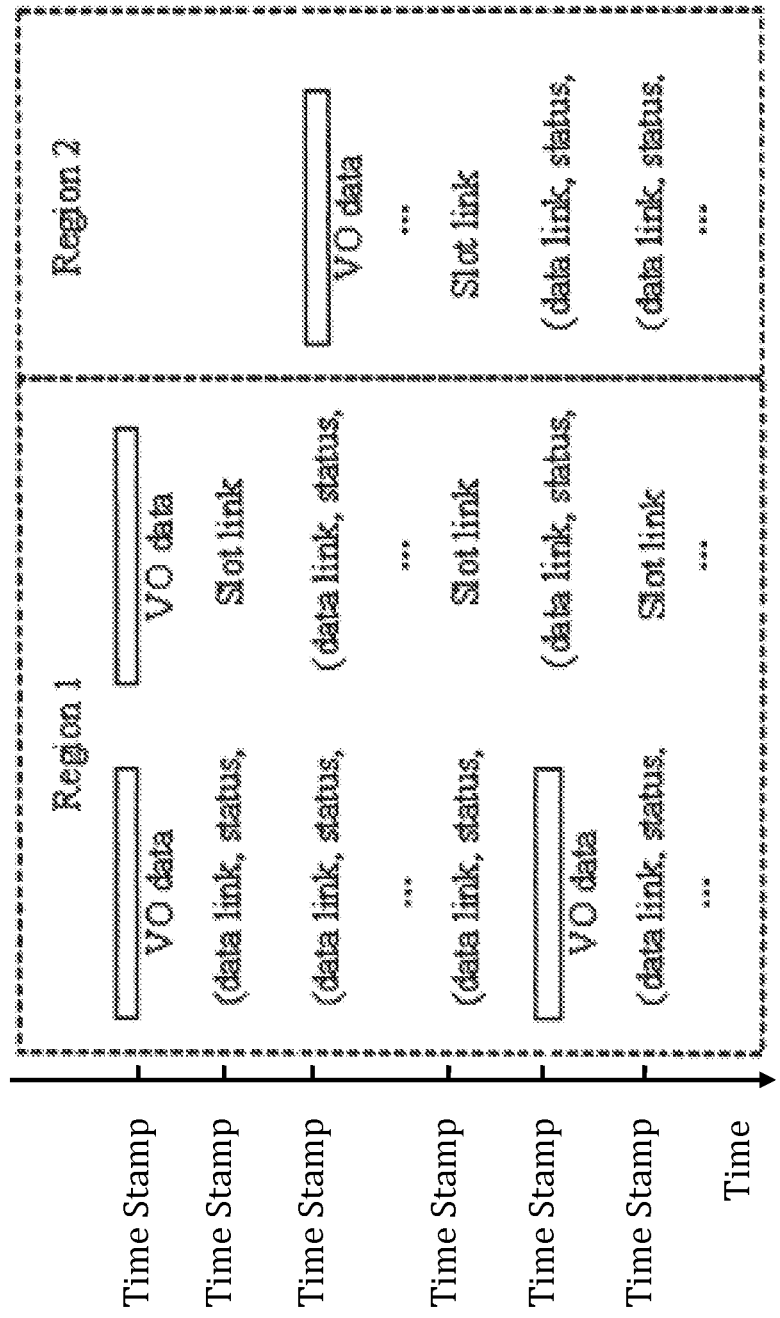
FIG. 14 shows how VO data is stored in separate tracks, according to an embodiment of the present invention.

In FIG. 14, VOs are stored in their own separate tracks. In each track, we store the following VO data:

1) VO Model Data. There are two cases in which VO Model Data are serialized into tracks. One case is that one VO is created. Then its data must be saved. The other case is that one VO has been changed many times, so the changes will be merged to the original model and the updated model will be saved.

2) the pair of data link and action. If in a tick a message about one VO is put into encoding and the message is not creating the VO, the data link to the position of the VW model will be computed firstly. Then the data link and the action will be saved in the track simultaneously.

3) Status Link. If in a tick one VO has not any messages, then the status link to the last changed status will be saved.

Terrain Track.

Figure 15:
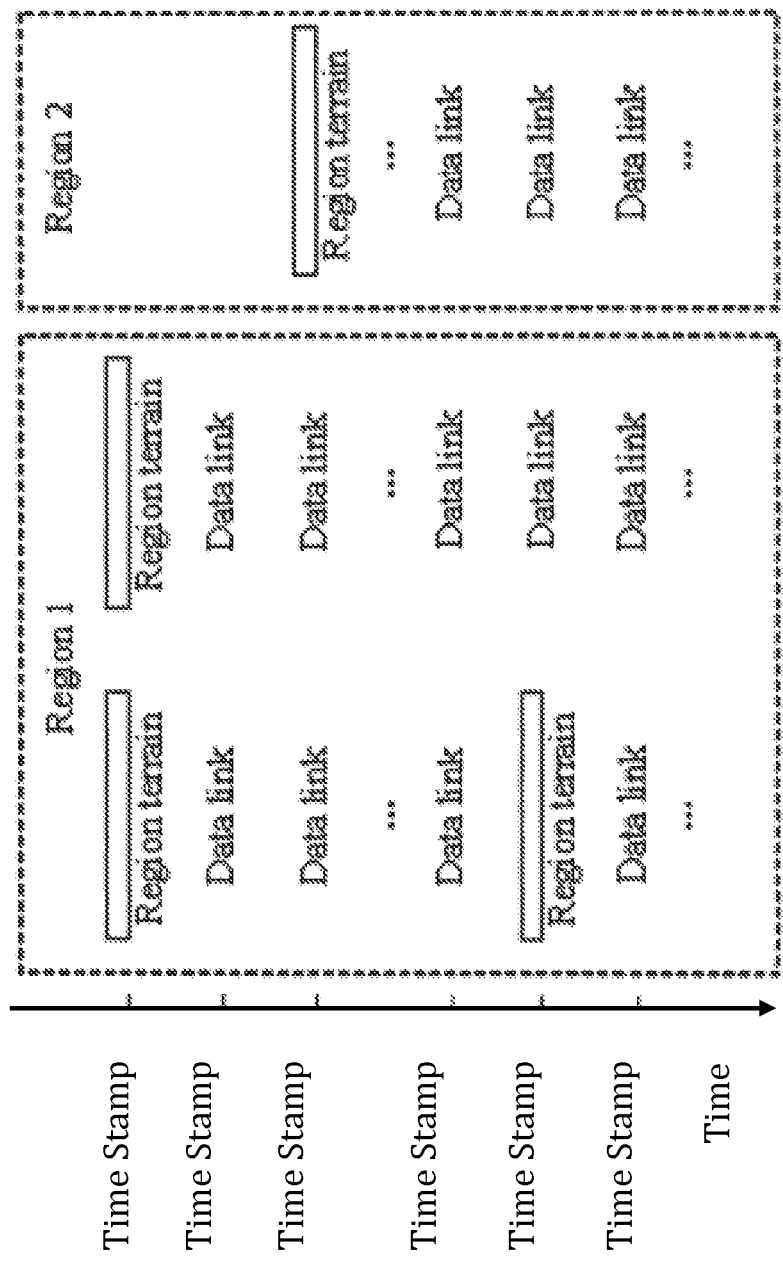
FIG. 15 shows how terrain descriptions are stored in their tracks, according to an embodiment of the present invention.

FIG. 15 shows the storing of terrains in their tracks. In each terrain track, the following data is stored:

1) terrain data. If one terrain is created or changed in a tick, the data of the terrain will be saved.

2) data link. If one terrain is not changed in a tick, then the data link to the last changed terrain will be saved.

Scenes are stored in persistent storage as files. If users want to relive these scenes, they can get the files from the storage and put the files into a player. The player will render the scenes. And users can immerse into the scenes. These are the steps: 1) files are read from storage; 2) data is buffered; 3) the files are delivered into a player to be decoded and rendered; 4) a controller will sample the current offsets where the files are played from reading module and player; and 5) when users perform the VCR operations, such as pause, rewind, stop, jump forward, jump backward, fast reverse, fast forward, and so on, the controller will control the reading module to perform the correct action.

Key time tick and common time tick.

Figure 5:
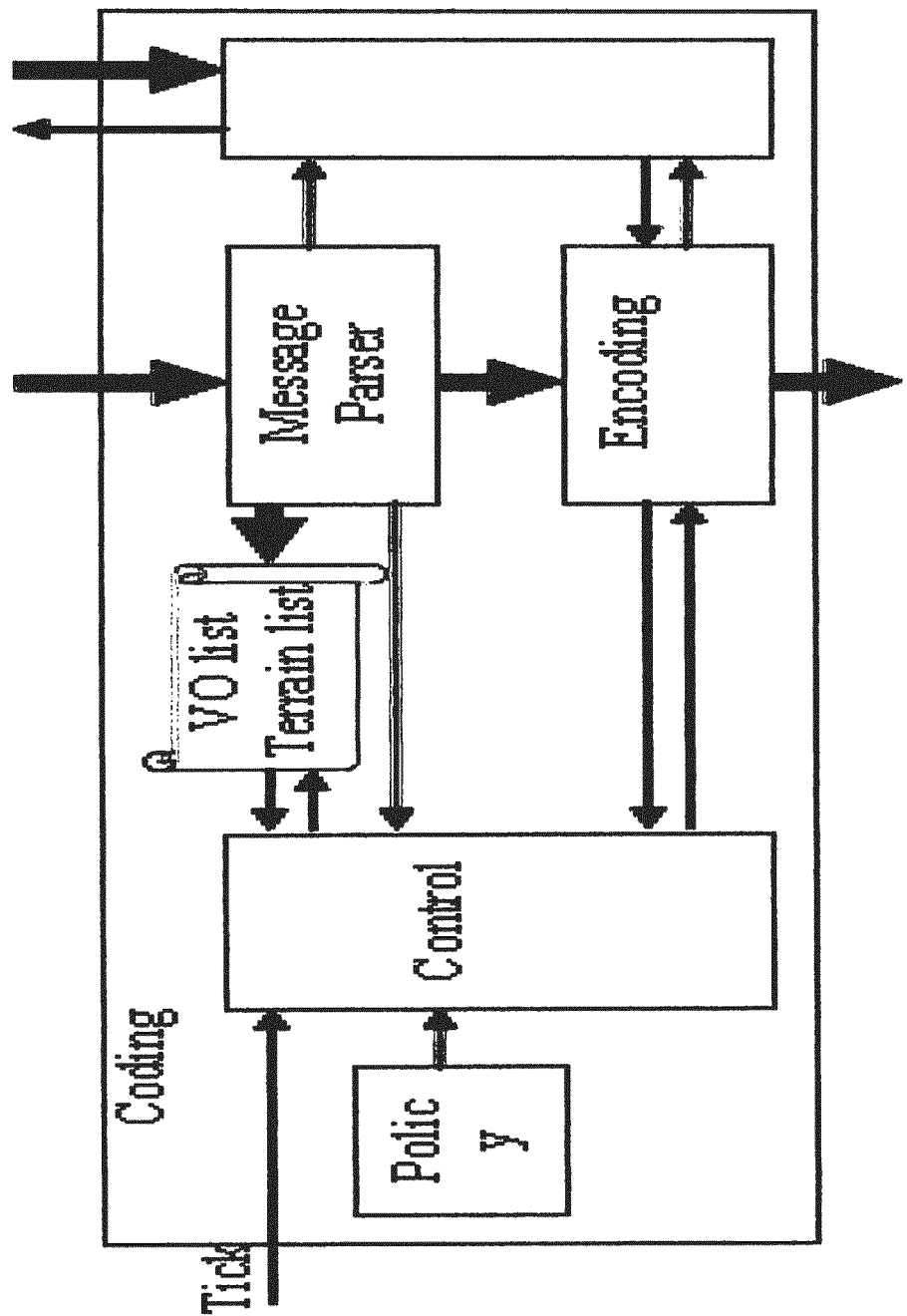
FIG. 5 shows a flow chart of the encoding process, according to an embodiment of the present invention.

Referring to FIG. 5, there is shown a high-level architecture diagram of the encoding method. In this method, the model data of VOs and terrains, the status of VOs, the actions of VOs, and other information, are serialized into streaming. So scenes can be rebuilt based completely on the streaming. In this method, the key time tick and the common time tick are defined. Key time tick is in which the scene can be rebuilt based on the information delivered in the time tick, independent of any other information. And a common time tick is in which the scene must be rebuilt based on the information delivered in the time tick AND the information delivered in the last key time tick.

Figure 6:
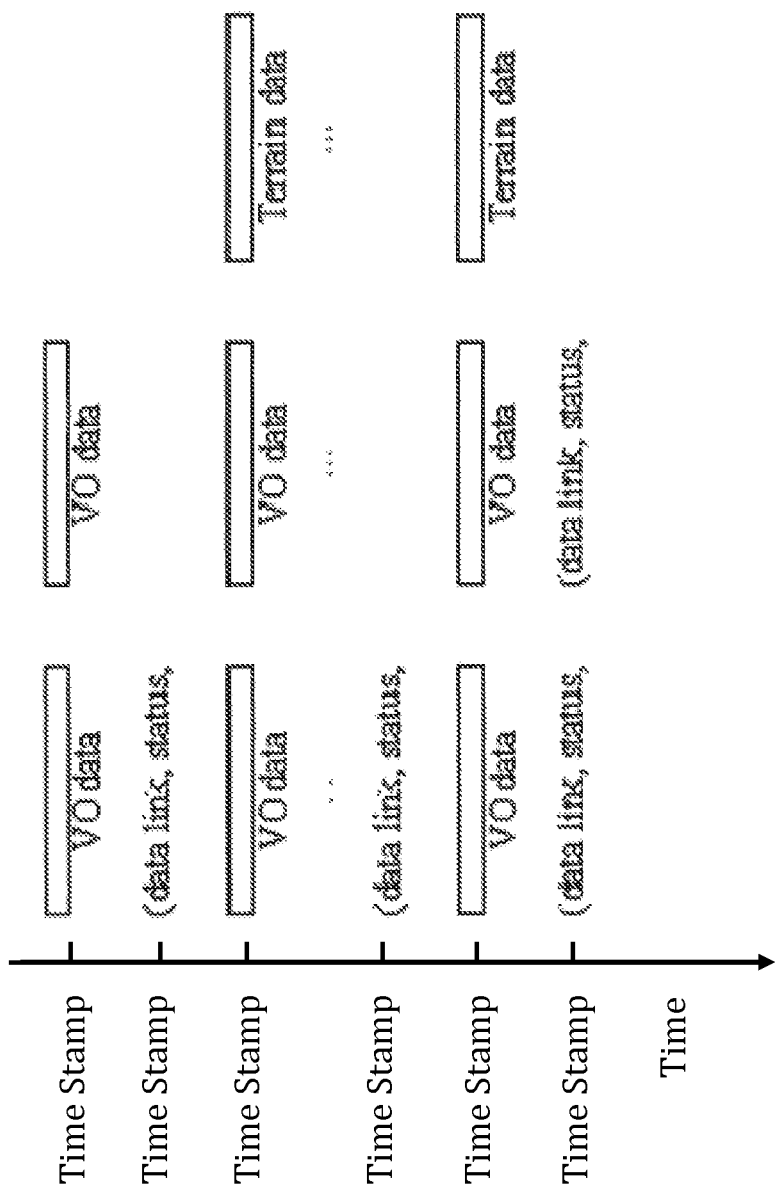
FIG. 6 shows the Encoding architecture diagram according to an embodiment of the present invention.

The differences between the key time tick and the common time tick can best be represented by their contents. The data structure in a key time tick contains: 1) VO model data and 2) terrain model data. The data structure in a common time tick contains the triple of data link, status, and action. If a message about one VO is put into encoding and the message is not creating the VO, the data link to the key time tick will be stored here. And the status and action in the time tick will be stored also. FIG. 6 shows an example of a common time tick.

Figure 7:
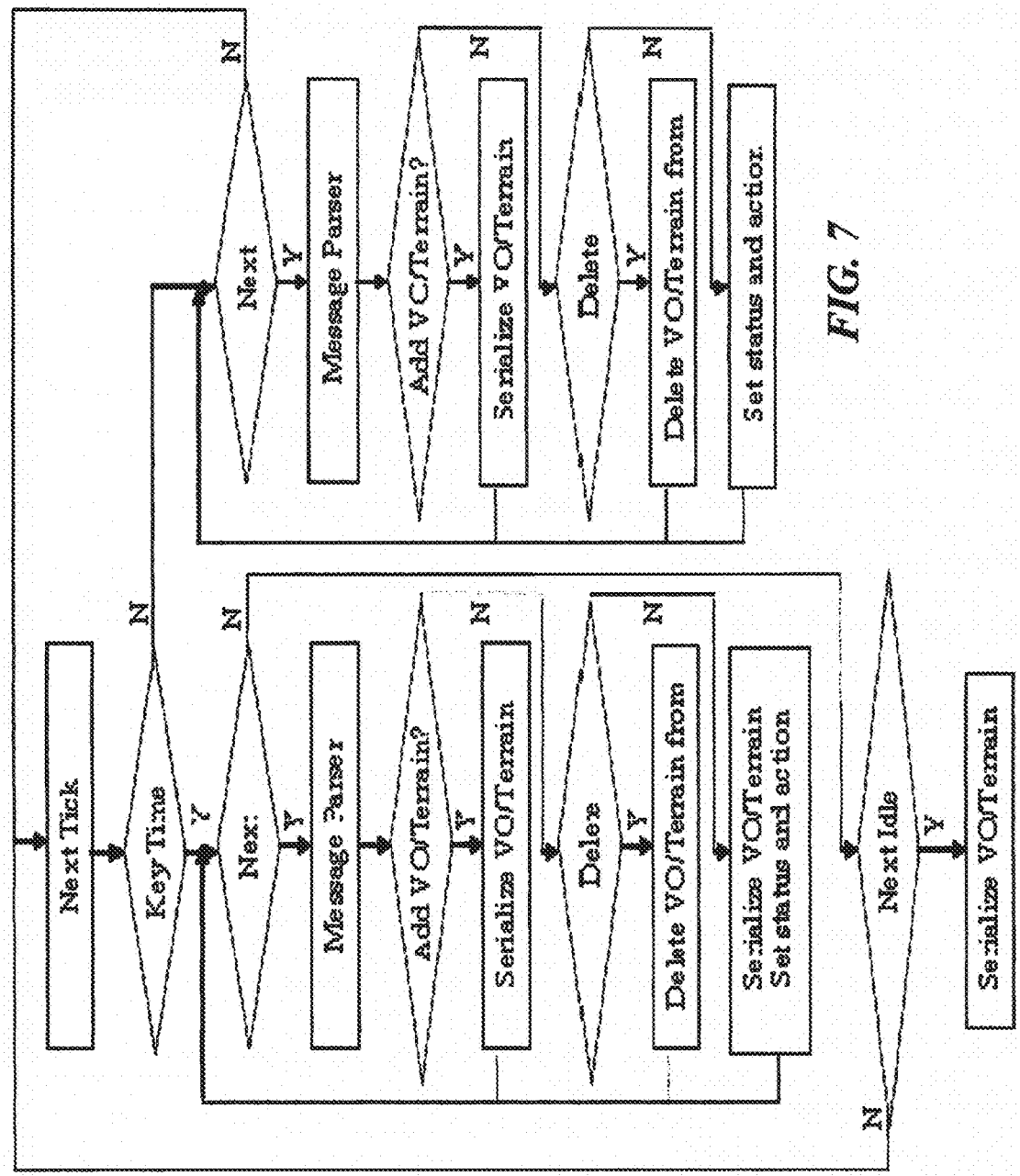
FIG. 7 shows the streaming format, according to an embodiment of the present invention.

FIG. 7 shows the encoding flow for method 2. In step 701, the Encoder will determine by examining a tick whether it is a key time slot. If yes, the processing continues to step 702, if not, then the processing skips to step 708. In step 702, after it has been determined that the tick represents a key time slot, AND if there is a next message that has not yet been handled, the message will be picked up and parsed. If there is no message in the queue, then the processing skips to step 707. However, in step 703, after the message is parsed, the Encoder will find the semantic of this message, adding (or deleting) a VO or terrain, changing the status of a VO, and so on.

In step 704, if the Encoder determines that a VO or terrain has to be added, then the requested VO or terrain will be serialized into the track. In addition, the VO or terrain will be added to the VO or terrain list, which is kept in persistent storage. In step 704 if the message requests a deletion, the VO or terrain will be removed from the VO/terrain list.

In step 706 if the message requests an update to a VO, the changed parts of the VO will be merged to the model data. Then the updated model will be serialized to this current position. The processing then returns to step 702. In step 707, if there are not any messages generated by VO at some tick, the status and action will be merged to the model data in the last key time slot, and then serialized to the time slot. Then the processing loops back to step 701.

In step 708, if there is a next message that is not handled, the message will be picked up and parsed. If not, go to step 701. In step 709, after the message begin parsed, it will find the semantic of this message, adding (or deleting) a VO or terrain, changing the status of a VO and so on.

In step 710, if it is adding VO or terrain, the VO or terrain will be serialized into the track. And the VO or terrain will be added to the VO or terrain list. In step 711, if it is deleting VO or terrain, then the VO or terrain will be removed from the VO/terrain list. in step 712, if it is updating a VO, the changed parts will be saved in the time slot. Then proceed to step 708.

Transmitting.

Figure 8:
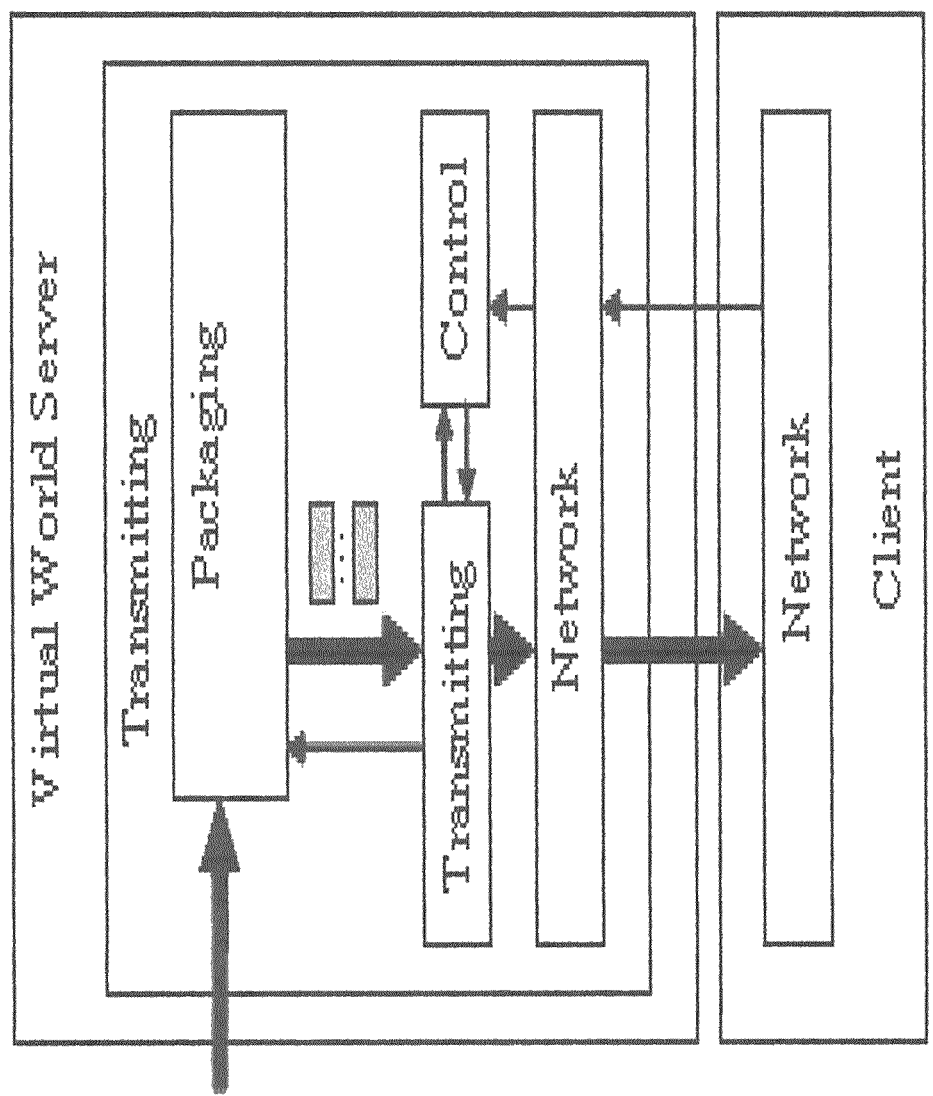
FIG. 8 shows a low-level flow chart of the encoding flow, according to an embodiment of the present invention.

A real-time transporting protocol is needed to support the live broadcasting of immersive 3D scene recording. FIG. 8 shows a diagram of the transmitting process. In step 801, the streaming of scene data is packaged into packages. In step 802, the packages are wrapped in a real-time transporting protocol. In step 803, the packages are sent to the client through the transmitting module. In step 804, if something is wrong with one package, an acknowledgment package will be sent from the client to the VW server. Then transmitting module will handle this event. Maybe, the module needs to notify the packaging module of the adjust packaging process.

Decoding.

Figure 9:
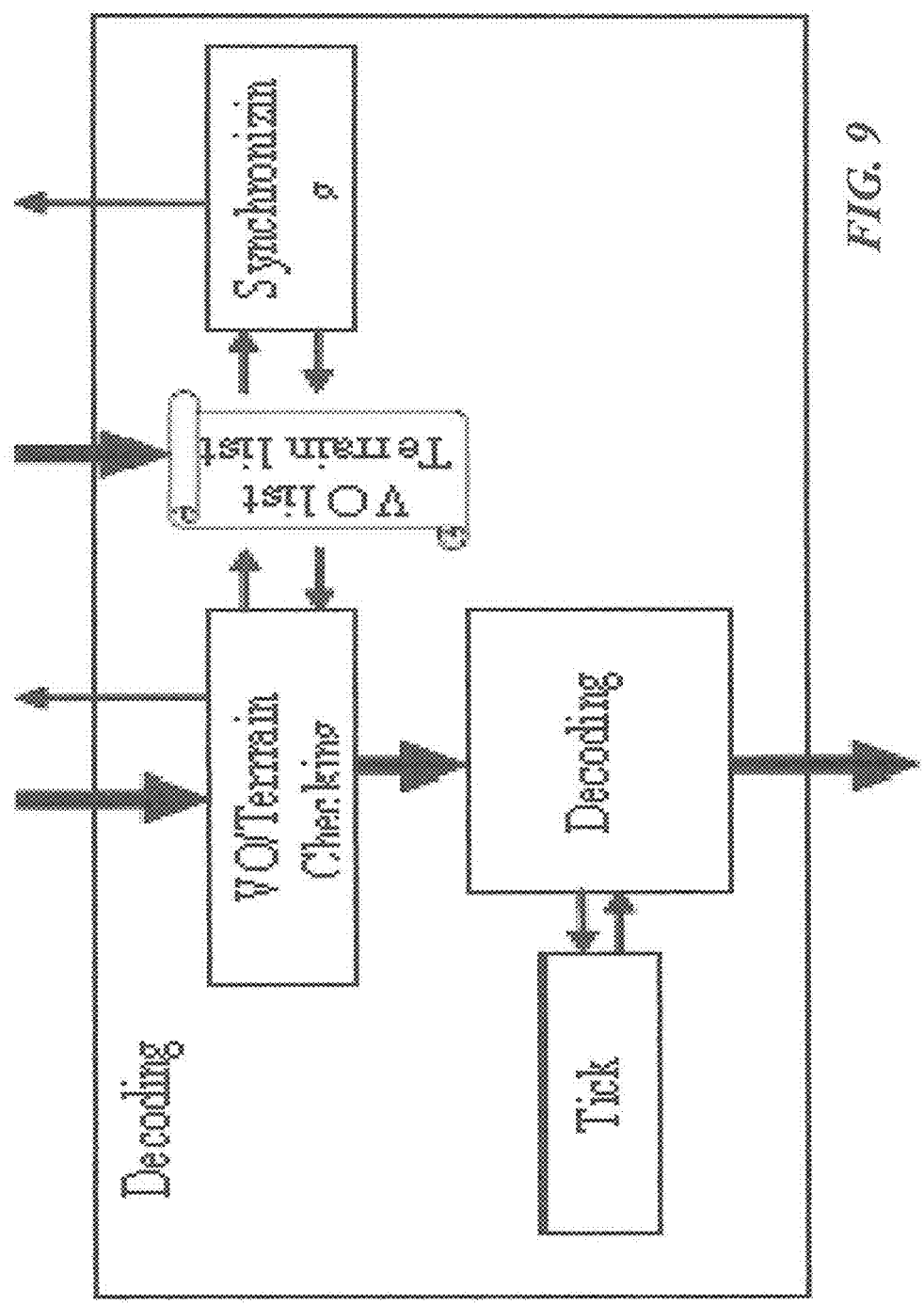
FIG. 9 shows a simplified diagram of the Transmitting architecture, according to an embodiment of the present invention.
Figure 10:
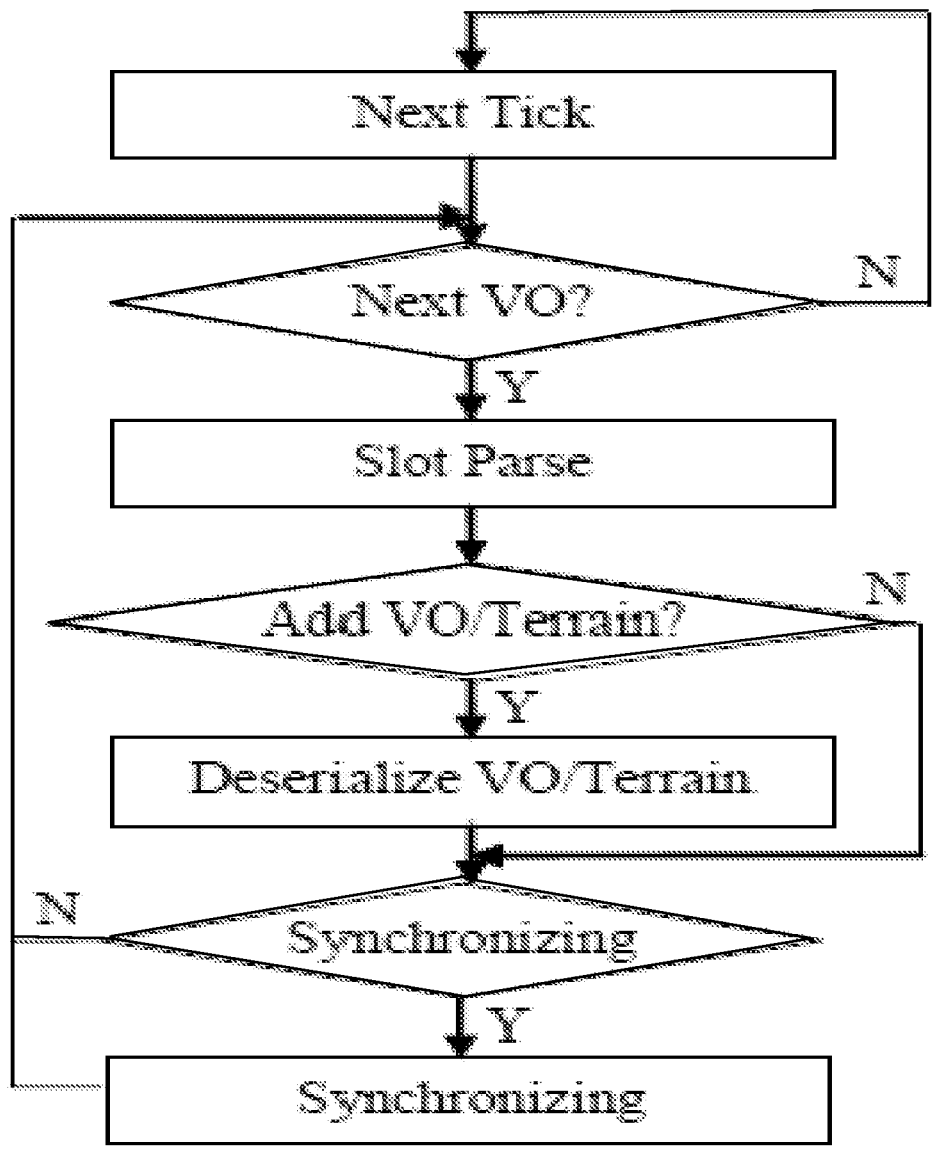
FIG. 10 shows a simplified diagram of the Decoding architecture, according to an embodiment of the present invention.

The architecture for the decoding process is shown in FIG. 9. The process of decoding is the reverse of encoding. The process flow diagram for the decoding process of method 2 is shown in FIG. 10. In step 1001, within the current tick, the Decoder checks whether there is a VO that hasn't been handled. If not, in step 1002, it returns to step 1001 to handle the next tick. In step 1003, if there is another VO, parse the slot. In step 1004, if the VO needs to be added to the scene, then deserialize it. In step 1005, if some synchronization is needed, perform the synchronization.

Figure 11:
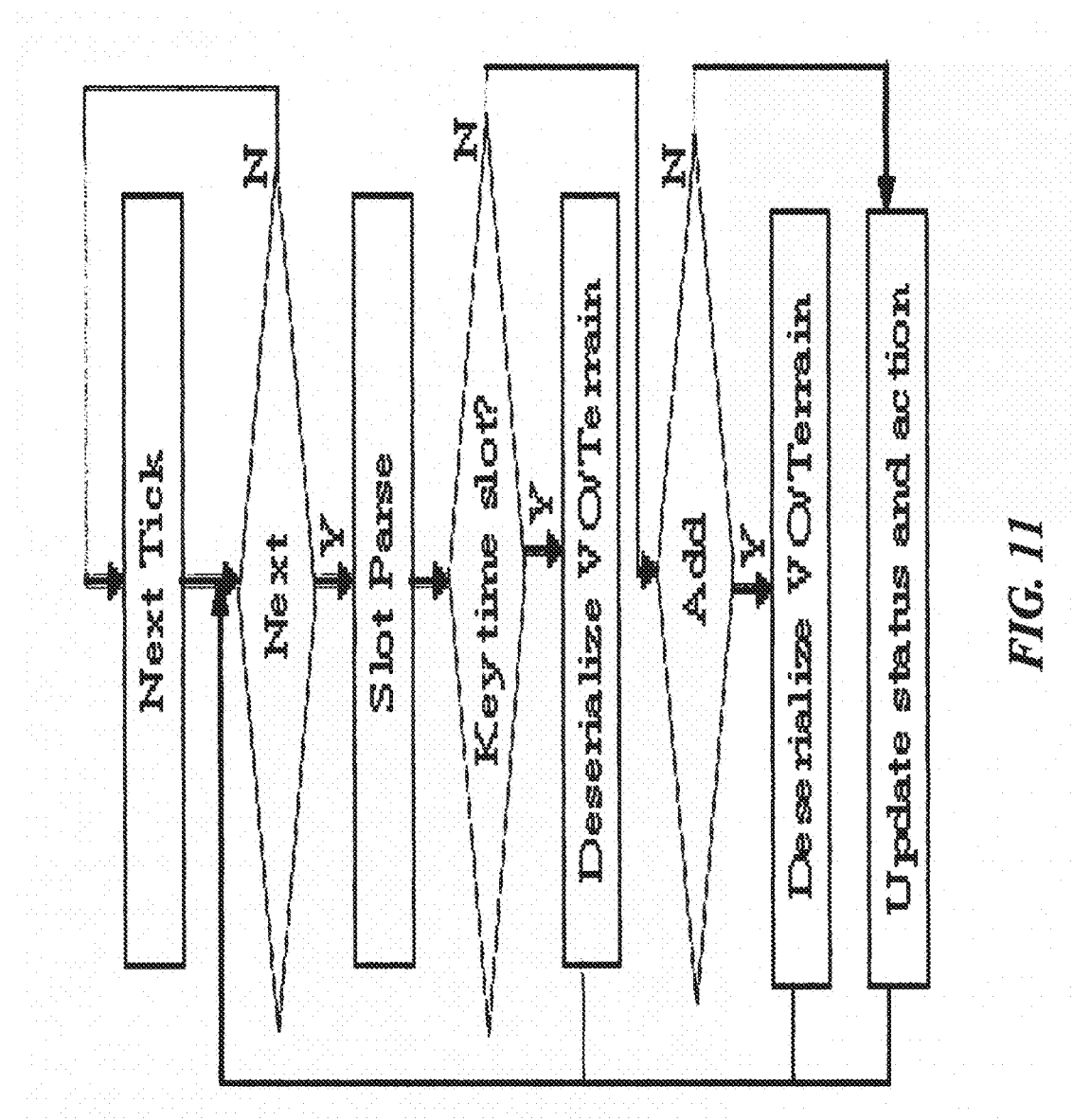
FIG. 11 shows a flow chart of the decoding process, according to an embodiment of the present invention.

FIG. 11 shows the flow diagram for method 2 decoding, which is the counterpart for method 2 encoding. In step 1101, if one tick, if there is another VO or terrain, go to next step. If not, then go to next tick. In step 1102 parse the time slot. If this is a key time slot, then deserialize all of the VOs and terrains. If not, then go to next step. In step 1103 if the message is to add VO or terrain, then deserialize them. If not, then go to next step. In step 1104, update the status and action, then go to step 1.

Filtering

This flow is described in the following figure.

1. Snapshot data are delivered from Snapshot module. Then the necessary data are picked up from the data according to the configuration from live broadcasting controller.

2. The picked up streaming data are buffered.

3. Streaming data are reorganized.

4. The reorganized data are delivered to the Encoding module.

5. When live broadcasting controller wants to change the region and other parameters during live broadcasting, he/she can send command to Range Control module. This module will control other modules to take changing actions.

According to the two methods, two streaming formats are defined and two set of processes of encoding and decoding are defined.

Method 1:

In this method, the IDs of virtual objects and terrains, status of virtual objects, actions of virtual objects and other information are serialized into streaming. But all of the model data are not embedded in the streaming. When the streaming is rendered, the player will fetch the model data of virtual objects and terrains from snapShot module in live broadcasting source servers. The architecture of the encoding module is shown in the following figure. The encoding format in method 1 is shown in the following figure. In this format, the data sequence of every virtual object or terrain is organized into one track. So there are two types of tracks here. One is VO track. And the other is terrain track. All of data in tracks are stored in time ticks.

These are called slots. The data structure in slots of VO tracks is shown in the following:

1. Virtual object model ID (VO ID). This ID indicates which virtual object the slot stands for. When the slot is rendered and the model object of the virtual object are not there, the player will fetch the model data of virtual objects and terrains from snapshot module in the live broadcasting system.

2. Status. This file records the status of the virtual object at this time.

3. Action. This field records the action that the virtual object takes at this time.

The data structure in slots of terrain tracks is shown in the following:

Terrain ID. This ID indicates which terrain the slot stands for.

FIG. 4 Streaming Format in Method 1

The encoding flow in method 1 is shown in the following figure.

1. Add VO slot for every message about VO.
2. Add terrain slot for every message about terrain.

FIG. 5 Encoding Flow in Method 1

Method 2:

In this method, the model data of virtual objects and terrains, status of virtual objects, actions of virtual objects and other information are serialized into streaming. So scenes can be rebuilt based on the streaming completely. The architecture of the encoding module is shown in the following figure. The encoding format in method 2 is shown in the following figure.

In this format, the data sequence of every virtual object or terrain is organized into one track. So there are two types of tracks here. One is VO track, and the other is terrain track. All of data in tracks are stored in time ticks. These are called slots. In method 2, key time tick and common time tick are defined. Key time tick is in which the scene can be rebuilt based on the information delivered in the time tick, independent of any other information. And common time tick is in which the scene must be rebuilt based on the information delivered in the time tick and the information delivered in the last key time tick.

The data structure in key time ticks is:
1. Virtual object model data.
2. Terrain model data.

The data structure in common time ticks includes: the triple of data link, status and action. If a message about one virtual object is put into encoding and the message is not creating virtual object, the data link to the key time tick will be stored here. And the status and action in the time tick will be stored as well.

Transmitting,

The transmitting proceeds as follows:

1. The streaming of scene data will be packaged into packages.
2. The packages will be wrapped in real time transporting protocol.
3. The packages will be sent to client through transmitting module.
4. If something is wrong with one packages, an acknowledge package will be sent from client to virtual world server. Then transmitting module will handle this event. Maybe, the module need to notify packaging module the adjust the packaging process.

Decoding

The process of decoding is a reverse one of encoding. According to the two encoding methods and two streaming formats, two methods are necessary.

Method 1:

This method is the counterpart of method 1 of encoding. The flow is described in the following figure.

1. Within the current tick, check whether there is a virtual object that hasn't been handled.
2. If not, go to step 1, handle next tick.
3. If there is another virtual object, parse the slot.
4. If the virtual object needs to be added to the scene, then deserialize it.
5. If some synchronization is needed, perform the synchronization.

Method 2:

This method is the counterpart of method 2 of encoding. The flow is described in the following figure.

1. In one tick, if there is another virtual object or terrain, go to next step. If not, then go to next tick.
2. Parse time slot. If this is a key time slot, then deserialize all of the virtual objects and terrains. If not, then go to next step. There is a data field in the structure, which describe the time ticks type.
3. If the message is to add virtual object or terrain, then deserialize them. If not, then go to next step.
4. Update the status and action. Then go to step 1.

Hardware Embodiment.

Figure 17:
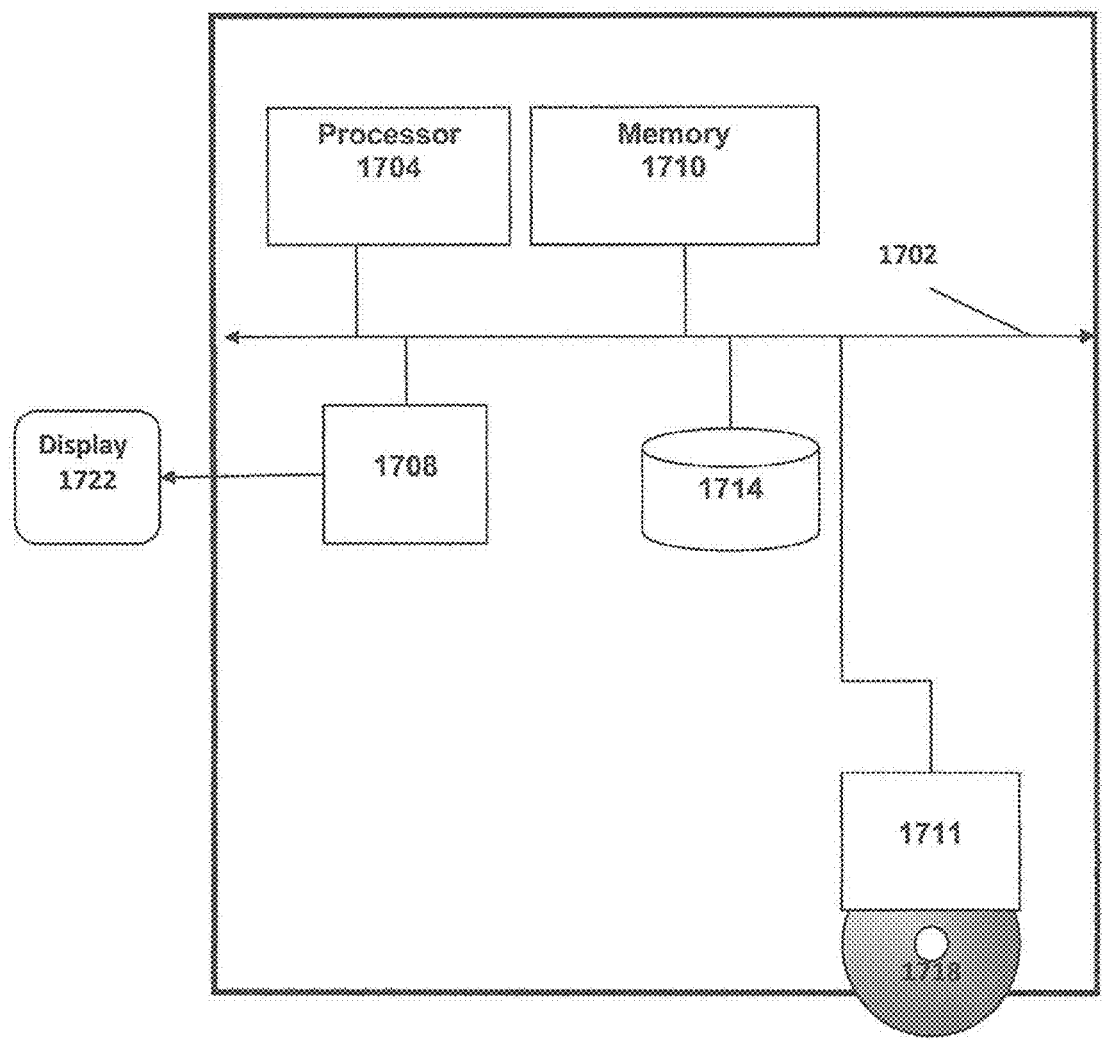
FIG. 17 is a high-level block diagram of a computer information processing system configured to operate according to an embodiment of the present invention.

Referring now to FIG. 17 we show a high-level block diagram showing a simplified information processing system useful for implementing embodiments of the present invention. The system 1700 includes one or more processor devices, such as processor 1704. The processor 1704 can be embodied as a multi-processor system. After reading this description, it will become apparent to a person of ordinary skill in the relevant art(s) how to implement the invention using other computer systems and/or computer architectures. This depiction of a computer system is provided solely to describe how a machine structure (an apparatus) can be implemented to perform the method steps as described above.

In one embodiment, the processor 1704 is coupled with a communication infrastructure 1702 (e.g., a communications bus, cross-over bar, or network). The computer system 1700 may also include a display interface 1708 to forward graphics, text, and other data from the communication infrastructure 1702 (or from a frame buffer not shown) for display on the display unit 1722. The computer system 1700 also includes a main memory 1710, preferably random access memory (RAM), and may also include secondary memory. The secondary memory may include, for example, a hard disk drive 1714 and/or a removable storage device 1711. The removable storage device 1711 reads from and/or writes to a removable storage unit 1718 in a manner well known to those having ordinary skill in the art. As will be appreciated, the removable storage unit 1718 includes a computer readable medium having stored therein computer software and/or data.

Computer programs (also called computer control logic) are stored in main memory 1710 and/or secondary memory. Such computer programs, when executed, enable the computer system to perform the features of the present invention as discussed herein. In particular, the computer programs, when executed, enable the processor device 1704 to perform the methods as previously described.

What has been shown and discussed is a highly-simplified depiction of a programmable computer apparatus. Those skilled in the art will appreciate that other low-level components and connections are required in any practical application of a computer apparatus capable of performing the described invention. Thus, a method, computer readable storage medium, and information processing system for implementing live broadcasting in a four-dimensional virtual format using immersive three-dimensional scene recording in the virtual world has been described. Various changes and modifications may be made in carrying out the present invention without departing from the spirit and scope thereof. Insofar as those changes and modifications are within the purview of the appended claims, they are to be considered as part of the present invention.

We claim:

1. A method of encoding a dynamic three-dimensional scene, comprising steps of:
    using an encoding module in a virtual world server, saving a snapshot of the three dimensional scene containing object space and status of all virtual objects and associated terrain by performing:
        receiving scene data comprising a first description of at least one virtual object and a second description of underlying terrain associated with the three dimensional scene;
        separating the first and second descriptions;
        organizing the first description into a first track segmented by virtual object time slots capturing an encoding and state of the at least one virtual object, said virtual object time slots comprising:
            a first key time tick comprising virtual object model data needed to rebuild the at least one virtual object in the three dimensional scene; and
            a first common time tick comprising a data link to the first key time tick, a status of the at least one virtual object at its associated virtual object time slot, and an action associated with said at least one virtual object at its associated virtual object time slot;
        organizing the second description into a second track segmented by terrain time slots capturing an encoding and state of the terrain, said terrain time slots comprising:
            a second key time tick comprising terrain model data needed to rebuild the terrain in the scene; and
            a second common time tick comprising a triple of a data link to the second key time tick, a status of the terrain at its associated terrain time slot, and an action associated with the terrain at its associated terrain time slot; and
    storing the first and second descriptions in persistent storage as separate files where users can retrieve only those virtual object and terrain descriptions that are required for scenes to be rendered.

2. The method of claim 1 wherein organizing the first description comprises:
    assigning to each virtual object time slot:
        a virtual object model identifier indicating which virtual object the virtual object time slot stands for;
        a status of the virtual object at the virtual object time slot; and
        an action associated with the virtual object at the virtual object time slot.

3. The method of claim 2 wherein when the virtual object time slot is rendered and a model object of the virtual object is not present, the method further comprises:
    fetching the model data of virtual objects and terrains from a snapshot module in a live broadcasting system.

4. The method of claim 2 wherein in the virtual object time slot, when one virtual object has no status changes, the method further comprises: pointing the status to a last changed status.

5. The method of claim 3 further comprising:
    receiving an update to the snapshot module of a virtual world scene;
    adding a virtual object time slot for every message about a virtual object; and
    adding a terrain time slot for every message about a terrain.

6. The method of claim 5 further comprising:
    storing the snapshot module in persistent storage; and
    serializing only selected portions of the snapshot module to be embedded into streaming.

7. The method of claim 1 wherein organizing the description of the underlying terrain comprises:
    assigning to each terrain time slot: a terrain identifier; and a data link.

8. The method of claim 7 wherein, if one terrain is not changed in the terrain time slot, then the data link points to a last changed terrain.

9. An information processing system for encoding a dynamic three-dimensional scene, comprising:
    storage; and
    a virtual world server comprising:
        a processor device configured to perform:
            using an encoding module, saving a snapshot of the three dimensional scene containing object space and status of all virtual objects and associated terrain by performing:
            receiving scene data comprising a first description of at least one virtual object and a second description of underlying terrain associated with the three dimensional scene;
            separating the first and second descriptions;
            organizing the first description into a first track segmented by virtual object time slots capturing an encoding and state of the at least one virtual object, said virtual object times slots comprising:
                a first key time tick comprising virtual object model data needed to rebuild the at least one virtual object in the three dimensional scene; and
                a first common time tick comprising a data link to the first key time tick, a status of the at least one virtual object at its associated virtual object time slot, and an action associated with said at least one virtual object at its associated virtual object time slot;
            organizing the second description of the underlying terrain into a second track segmented by terrain time slots capturing an encoding and state of the terrain, said terrain times slots comprising:
a second key time tick comprising terrain model data needed to rebuild the terrain in the three dimensional scene; and
a second common time tick comprising a data link to the second key time tick, a status of the terrain at its associated terrain time slot, and an action associated with the terrain at its associated terrain time slot; and
storing the first and second descriptions in the storage as separate files where users can retrieve only those virtual object and terrain descriptions that are required for any scenes to be rendered.

10. The information processing system of claim 9 wherein each terrain time slot comprises: a terrain identifier; and a data link.

11. The information processing system of claim 9 wherein each virtual object time slot comprises:
a virtual object model identifier indicating which virtual object the virtual object time slot stands for;
a status of the virtual object at the virtual object time slot; and
an action associated with the virtual object at the virtual object time slot.

12. The information processing system of claim 11, wherein in the virtual object time slot, when one virtual object has no status changes, the status points to a last changed status.

13. The information processing system of claim 11, further comprising a snapshot model of the three dimensional scene; wherein, for every update to the snapshot module
an additional virtual object time slot for every message about the virtual object; and
an additional terrain time slot for every message about the terrain is added.

14. A computer readable storage medium comprising program code instructions that, when executed by a computer programming device, enable the computer programming device to perform steps of:
using an encoding module in a virtual world server, saving a snapshot of a three dimensional scene containing object space and status of all virtual objects and associated terrain in said three dimensional scene by performing:
receiving scene data comprising a first description of at least one virtual object and a second description of underlying terrain associated with the three dimensional scene in the virtual world server;
separating the first and second descriptions;
organizing the first description into a first track segmented by virtual object time slots capturing an encoding and state of the at least one virtual object, said virtual object time slots comprising:
a first key time tick comprising virtual object model data needed to rebuild the at least one virtual object in the scene; and
a first common time tick comprising a data link to the first key time tick, a status of the at least one virtual object at its associated virtual object time slot, and an action associated with the at least one virtual object at its associated virtual object time slot;
organizing the second description into a second track segmented by terrain time slots capturing an encoding and state of the terrain, said terrain time slots comprising:
a second key time tick comprising terrain model data needed to rebuild the terrain in the scene; and
a second common time tick comprising a triple of a data link to the second key time tick, a status of the terrain at its associated terrain time slot, and an action associated with the terrain at its associated terrain time slot; and
storing the first and second descriptions in persistent storage as separate files where users can retrieve only those virtual object and terrain descriptions that are required for scenes to be rendered.

15. The computer readable storage medium of claim 14 wherein organizing the description of the at least one virtual object comprises:
assigning to each virtual object time slot:
a virtual object model identifier indicating which virtual object the virtual object time slot stands for;
a status of the virtual object at the virtual object time slot; and
an action associated with the virtual object at the virtual object time slot.

16. The computer readable storage medium of claim 15 wherein when the virtual object slot is rendered and a model object of the virtual object is not present, the method further comprises:
fetching the model data of virtual objects and terrains from a snapshot module in a live broadcasting system.

17. The method of claim 15 wherein in the virtual object time slot, when one virtual object has no status changes, the method further comprises pointing the status to a last changed status.

18. The method of claim 16 further comprising:
receiving an update to the snapshot module of a virtual world scene;
adding a virtual object time slot for every message about a virtual object; and
adding a terrain time slot for every message about a terrain.

19. The method of claim 17 further comprising: storing the snapshot module in persistent storage; and serializing only selected portions of the snapshot module to be embedded into streaming.

20. The method of claim 14 wherein organizing the description of the underlying terrain comprises: assigning to each terrain time slot: a terrain identifier; and a data link.

* * * * *